Oct. 20, 1959     K. T. NORELL     2,909,286
SEPARATOR FOR FILTERING OUT SOLIDS
Filed May 11, 1956     2 Sheets-Sheet 2

INVENTOR.
KARL NORELL
BY
ATTORNEYS

United States Patent Office 2,909,286
Patented Oct. 20, 1959

2,909,286

SEPARATOR FOR FILTERING OUT SOLIDS

Karl Torvald Norell, Bofors, Sweden, assignor to Aktiebolaget Bofors, Bofors, Sweden, a corporation of Sweden Application May 11, 1956, Serial No. 584,389

11 Claims. (Cl. 210—408)

The present invention relates to filtering devices, and more particularly to filtering devices for separating discrete solid particles from a liquid.

One object of the present invention is to provide a novel and improved filtering device of the general kind above referred to, which for its size is capable of processing a large quantity or volume of material to be filtered out in a given period of time.

Another object of the present invention is to provide a novel and improved filtering device which separates the material to be filtered out rapidly and efficiently so that the filtered-out solids can be withdrawn from the device after a brief filtering operation.

Still another object of the invention is to provide a novel and improved filtering device which affords the advantage of a thorough filtering operation while using a minimum volume of washing liquid.

A further object of the present invention is a novel and improved filtering device which conveniently permits a uniform distribution of the material to be filtered out on the filtering member proper of the device and the selection of a rate of feed of liquid containing solids best suitable for the specific filtering operation in progress.

Other and further objects, features and advantages of the invention will be pointed out hereinafter and set forth in the appended claims forming part of the application.

In the accompanying drawing a preferred embodiment of the invention is shown by way of illustration and not by way of limitation.

Figure 1:
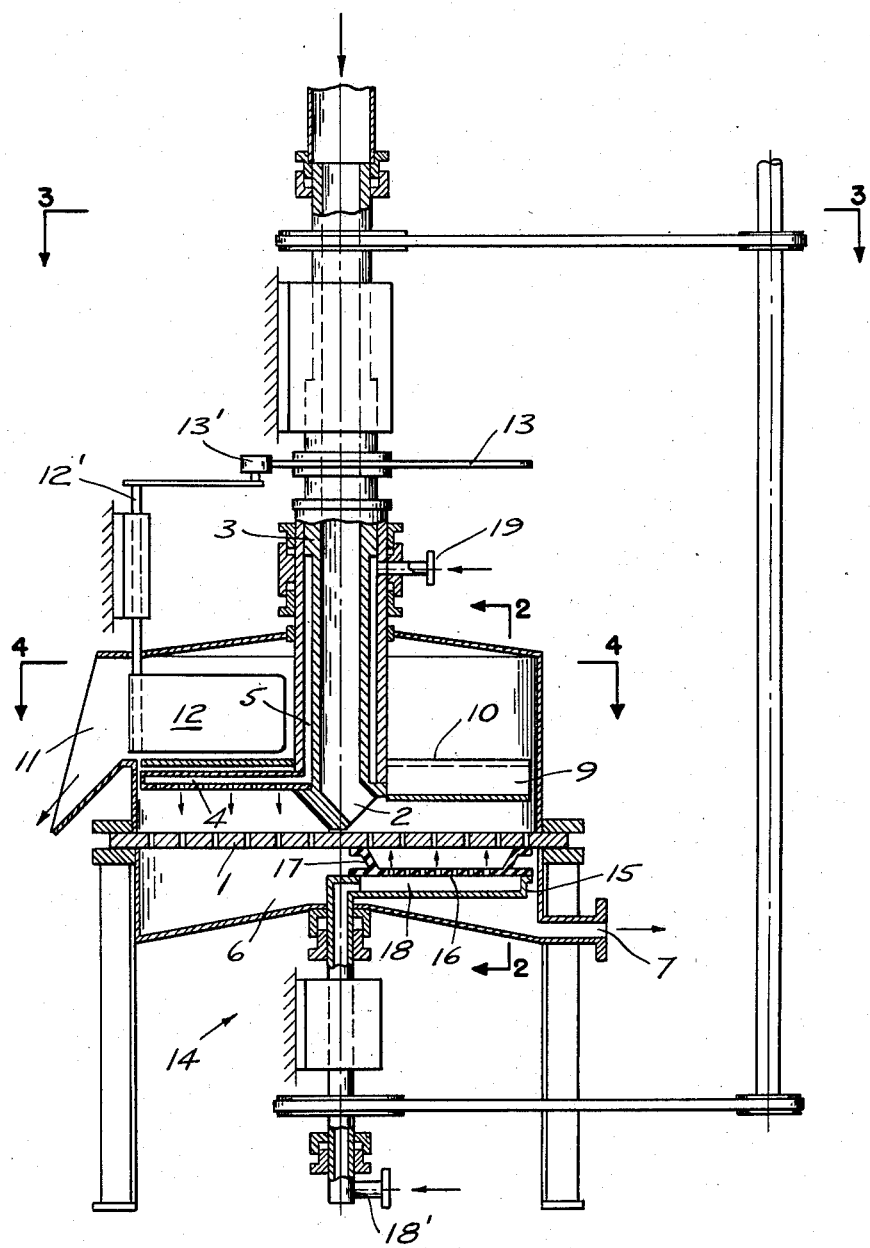
Fig. 1 is an elevational sectional view of a filtering device according to the invention.
Figure 2:
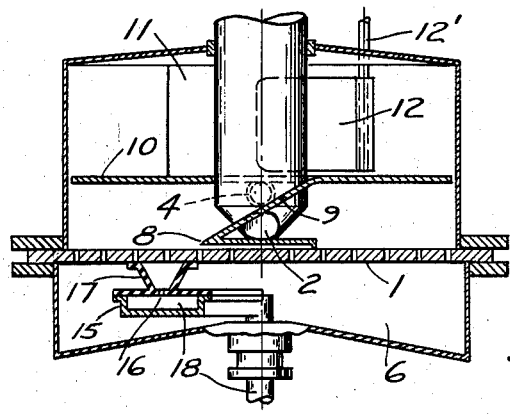
Fig. 2 is a cross sectional view taken along line 2—2 of Fig. 1, showing diagrammatically the filtering device on a reduced scale.
Figure 3:
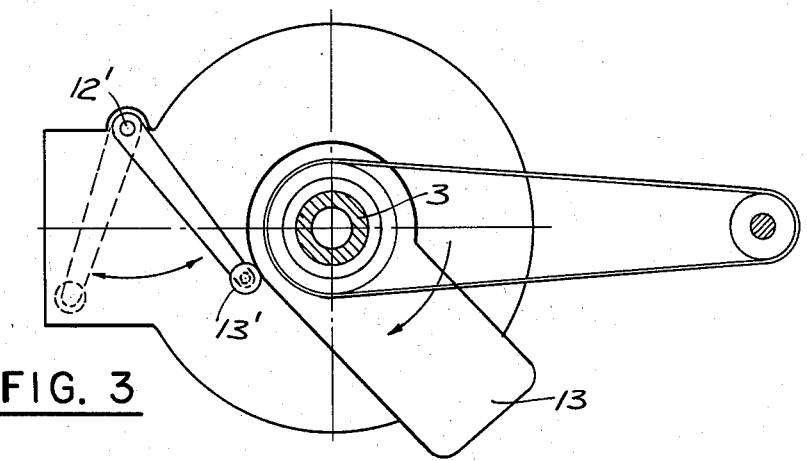
Fig. 3 is a cross sectional view taken along line 3—3 of Fig. 1.
Figure 4:
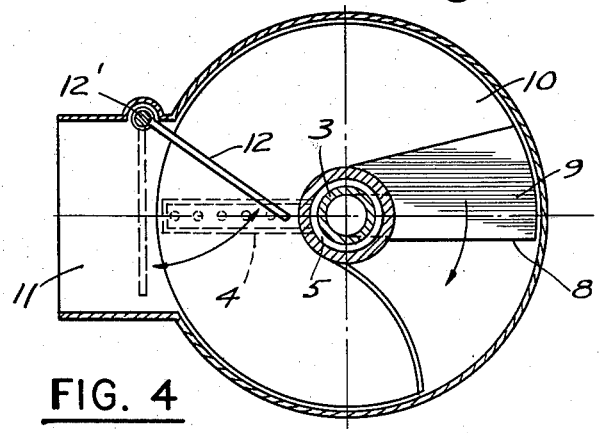
Fig. 4 is a transverse cross sectional view taken along line 4—4 of Fig. 1.

Referring now to the figures in detail, the filtering device as exemplified comprises a stationarily mounted perforated circular disc 1. The liquid containing solids to be filtered out are supplied to disc 1 through a rotary hollow shaft 3, the outlet head 2 of which is radially slanted to distribute the material substantially uniformly over disc 1 as shaft 3 rotates. Shaft 3 mounts a scraping device 8, such as a doctor blade, radially extending across disc 1. The doctor blade is provided with upwardly turned guide members 9 which serve to sweep the solids accumulating on disc 1 upon an elevated platform 10 from which they are removed. As is apparent, both the doctor blade and the platform rotate jointly with shaft 3.

Platform 10 is generally circular, but ends about 300° from the leading edge of the doctor blade in the direction of rotation to provide a gap through which the doctor blade or, more specifically the guide, members 9 thereof can push the material accumulating on disc 1 upon the platform. The material collecting on the platform is removed therefrom through a chute 11. To facilitate removal of the material from the platform, agitating or stirring means 12 are provided. These means are shown as a blade or wiper arm which is reciprocated by means of a cam disc 13 secured to shaft 3 and rotating in unison therewith. This cam coacts with a cam follower 13' which in turn is mounted on a rotary shaft 12' supporting blade 12.

The shaft further supports for rotation jointly therewith a tube 4 radially extending from the shaft and closed at its outer end. At least the side of the tube facing disc 1 is perforated and the tube communicates with a longitudinal duct 5 in shaft 3. The tube serves to supply washing liquid to the disc 1 which is supplied through a pipe 19 communicating with the tube through duct 5.

The discharge or lower side of disc 1 is subjected to a vacuum for the purpose of drawing liquid fed to the receiving side of the disc together with the solids to be filtered out and the washing liquid through the disc. The vacuum is maintained by means of a closed vacuum vessel 6, the top of which is formed by disc 1. The vacuum vessel communicates with a suction pipe which serves to produce the vacuum in vessel 6 and also to withdraw the filtrate flowing into vessel 6 through disc 1.

It has been found that as a result of the vacuum drawing the liquid through the disc, the sweeping action of the doctor blade and the effect of the washing device, a filtering speed can be conveniently attained such that the solids accumulating on disc 1 are washed and dry enough for removal from the device after a rotation of distributor head 2 through an angle of less than one revolution. The efficiency of the filtering and washing operation as attained by the aforedescribed components permits a selection of the thickness of the layer of solids accumulating on the disc primarily in accordance with the specific properties of the material to be filtered. Furthermore, the continuous spreading of the solids on the disc into a layer of substantially uniform thickness effected by the doctor blade permits the use of a minimum of washing fluid. Finally, the gravity flow of the filtrate combined with the use of a stationary discharge pipe 7 reduce all sealing problems to a minimum.

It has been found that certain solids tend to cake on the receiving side of the filtering disc which makes it difficult for the doctor blade to sweep the accumulations upon the elevated platform 10. To loosen such caking solids a loosening means 14 is provided below the disc and preferably within the vacuum vessel 6. This means is shown as comprising a hollow shaft 18 rotatable coaxially with shaft 3. Shaft 18 is continued in a radial arm 15, the upper part of which, that is, the side facing the discharge side of disc 1 is perforated and flexible. In other words, the upper side of the arm is in the nature of a diaphragm. The perforated part of the arm is framed by a collar 17 which is in sliding engagement with the stationary filter disc. Air under pressure is supplied to shaft 18 and with it to arm 15 through a pipe 18'. The pressure air will penetrate a limited area of the filter disc and at the same time the diaphragm 16 will experience a certain upward deflection by the force of the pressure air whereby an adequate seal is obtained between collar 17 and the lower side of disc 1.

Arm 15 is rotated in synchronism with the doctor blade and is positioned anterior thereof as seen in the direction of rotation so that the material collecting on the receiving side of disc 1 is continuously loosened in front of the doctor blade.

The filtering device according to the invention is suitable for a variety of materials. Among those for which it can be used particularly advantageously may be mentioned organic and inorganic fibrous materials such as cellulose fibers or asbestos fibers and furthermore any crystalline composition which should be separated from the mother liquid as e.g. in the manufacture of trinitrotoluol.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A filtering device for filtering out solids contained in a liquid in a continuous operation, said device comprising a stationarily mounted filtering member having a plane horizontal receiving side, a feed duct for feeding liquid to be filtered upon said receiving side, a rotary distributing means distributing solids collecting upon said receiving side and sweeping said side for removing the solds therefrom, said rotary distributing means comprising a radially extending doctor blade adjacent to said receiving side of said filtering member, a segmental circular platform spaced above said receiving side of said filtering member, an inclined plane extending between and being integral with said doctor blade and said segmental circular platform for elevating solids from said filtering member to said platform in response to relative rotation between said doctor blade and said filtering member with said doctor blade leaving said platform, suction means applied to the filtering member on the discharge side thereof opposite the receiving side to draw the filtrate through the filtering member, rotary pressure means for directing a fluid flow under pressure through a limited area of said filtering member from the discharge side thereof, said pressure means rotating in the same direction as said distributing means and being disposed anterior of the distributing means, rotary conduit means for directing a stream of washing liquid upon the receiving side of the filtering member, said conduit means being rotatable in the same direction as the distributing means along a circular path coaxial with the rotational axis of the distributing means, and a wiper arm overlying said platform in the path of movement of solids collected by said platform from said receiving side of said filtering member by said doctor blade, said wiper arm directing said collected solids radially outwardly from said platform.

2. A filtering device according to claim 1, wherein said distributing means and said conduit means are mounted on a common rotary shaft radially extending therefrom, said shaft including a first longitudinal duct opening upon the filtering member to form said feed duct and a second longitudinal duct communicating with said conduit means to supply the latter with washing liquid.

3. A filtering device according to claim 2, wherein said first duct has an outlet head disposed at an angle with the plane of the receiving side of said filtering member.

4. A filtering device according to claim 3, wherein said pressure means are mounted on a second rotary shaft disposed coaxially with said first shaft, said second shaft including a duct communicating with said pressure means for supplying the latter with pressure fluid.

5. A filtering device according to claim 4, wherein said feed duct is rotatably mounted about an axis coaxial with the rotational axis of the doctor blade.

6. A filtering device according to claim 5, wherein said duct has an outlet head situated anteior of the doctor blade as seen in the direction of rotation thereof.

7. A filtering device according to claim 1, wherein said rotary conduit means comprise a horizontal perforated tube rotary about an axis common with said distributing means and said pressure means, said tube communicating with a supply of washing liquid.

8. A filter device for separating solids contained in a liquid in a continuous operation, said device comprising a stationarily mounted filtering member having a plane horizontal receiving side, a feed duct for feeding the liquid to be filtered upon said receiving side, a rotary distributing means distributing the solids collected upon said receiving side and sweeping said receiving side for removing solids therefrom, suction means applied to the filtering member of the discharge side thereof opposite the receiving side to draw the filtrate through the filtering member, discharge means for discharging solids collected upon and swept off from said receiving side by said distributing means, and a collecting platform, said distributing means including guide means for sweeping solids collecting upon said filtering member upon said platform, and said discharge means removing the solids from the platform.

9. A filtering device as set forth in claim 8, wherein said platform is supported above said filtering member and said distributing means, and said platform is mounted for rotation in unison with said distributing means about a common longitudinal axis.

10. A filtering device as set forth in claim 9, further comprising sweeping means supported above said platform for transporting solids collecting thereon to said discharge means.

11. A filtering device as set forth in claim 10, wherein said sweeping means comprises a wiper arm pivotally supported for rotation about a longitudinal axis substantially parallel to said common axis, and drive means effecting reciprocating movement of said wiper arm about said pivot axis.

References Cited in the file of this patent

UNITED STATES PATENTS

| 262,702 | Sears et al. | Aug. 15, 1882 |
| 1,357,499 | Hunt | Nov. 2, 1920 |
| 1,995,648 | Rathburn | Mar. 26, 1935 |
| 2,089,702 | Lomax | Aug. 10, 1937 |
| 2,310,587 | MacNeill | Feb. 9, 1943 |

FOREIGN PATENTS

| 717,654 | Great Britain | Oct. 27, 1954 |